US008316738B2

United States Patent
Hellinger et al.

(10) Patent No.: US 8,316,738 B2
(45) Date of Patent: *Nov. 27, 2012

(54) COMPACT TRANSFER CASE WITH BEVELOID GEARSET

(75) Inventors: William A. Hellinger, Mexico, NY (US); John D. Zalewski, Liverpool, NY (US); David W. Wenthen, Syracuse, NY (US); Brian M. Fitzgerald, Cazenovia, NY (US)

(73) Assignee: Magna Powertrain of America, Inc., Troy, MI (US)

( * ) Notice: Subject to any disclaimer, the term of this patent is extended or adjusted under 35 U.S.C. 154(b) by 724 days.

This patent is subject to a terminal disclaimer.

(21) Appl. No.: 12/481,779

(22) Filed: Jun. 10, 2009

(65) Prior Publication Data

US 2010/0313706 A1 Dec. 16, 2010

(51) Int. Cl.
*F16H 37/06* (2006.01)
*B60K 23/08* (2006.01)
*F16D 19/00* (2006.01)

(52) U.S. Cl. ............... 74/665 H; 180/247; 192/93 A

(58) Field of Classification Search ............. 74/665 A, 74/665 C, 665 F, 665 H; 180/247, 248, 249
See application file for complete search history.

(56) References Cited

U.S. PATENT DOCUMENTS

| 4,688,447 A | | 8/1987 | Dick | |
|---|---|---|---|---|
| 4,860,612 A | * | 8/1989 | Dick et al. | 74/665 H |
| 5,116,293 A | * | 5/1992 | Reuter | 475/202 |
| 5,226,860 A | * | 7/1993 | Baxter et al. | 475/206 |
| 5,348,517 A | * | 9/1994 | Dick | 475/210 |
| 5,669,460 A | * | 9/1997 | Showalter | 180/233 |
| 5,725,453 A | * | 3/1998 | Zalewski et al. | 475/204 |
| 7,399,250 B2 | * | 7/2008 | Gansloser et al. | 475/249 |
| 7,992,668 B2 | * | 8/2011 | Smith et al. | 180/247 |
| 2002/0165031 A1 | | 11/2002 | Riefe | |
| 2007/0191117 A1 | | 8/2007 | Mueller et al. | |

OTHER PUBLICATIONS

Dr, Ing, Joerg Boerner, Dipl.-Ing. Klemens Humm, Dr.-Ing. Franz J. Joachim Development of Conical Involute Gears (Beveloids) for Vehicle Transmissions Nov./Dec. 2005 Gear Technology p. 28-35.
8. European All Wheel Drive Congress Graz 19. und 20. Apr. 2007 Allradtechnik im Spannungsfeld Zwischen Komplexitat und Kundennutzen 9 pages Gerhard Henning, DaimlerChrysler AG.

* cited by examiner

*Primary Examiner* — Troy Chambers
*Assistant Examiner* — Jude Agendia
(74) *Attorney, Agent, or Firm* — Harness, Dickey & Pierce, P.L.C.

(57) ABSTRACT

A power transmission device for a four-wheel drive vehicle having a power source and first and second drivelines includes an input shaft adapted to be driven by the power source. A first output shaft is rotatable about a first axis and adapted to transmit torque to the first driveline. A second output shaft is adapted to transmit torque to the second driveline and is rotatable about a second axis. The first and second axes do not extend parallel to each other. A transfer unit includes a first cylindrically-shaped gear rotatably supported on the first output shaft and a second conically-shaped gear fixed for rotation with the second output shaft. The first and second gears are in constant meshed engagement with each other.

17 Claims, 4 Drawing Sheets

COMPACT TRANSFER CASE WITH BEVELOID GEARSET

FIELD

The present disclosure relates generally to a power transmission device for use in a motor vehicle. More particularly, the present disclosure describes a compact transfer case having crossed axis output shafts for providing drive torque to first and second drivelines of a four-wheel drive vehicle.

BACKGROUND

Many sport-utility vehicles are equipped with a transfer case for transmitting drive torque to all four of the wheels, thereby establishing a four-wheel drive mode of operation. Some transfer cases are equipped with a mode shift mechanism which permits the vehicle operator to selectively shift between a two-wheel drive mode wherein only the primary (i.e., rear) driveline is driven and a "part-time" four-wheel drive mode wherein the secondary (i.e., front) driveline is rigidly coupled for rotation with the primary driveline.

In the past, the vehicle ride height and suspension configuration of many sport-utility vehicles provided sufficient packaging volume for a traditional transfer case having at least two rotating output shafts extending parallel to one another. In view of increased consumer demand for smaller four-wheel drive vehicles, the packaging volume allocated to the vehicle powertrain has been greatly reduced. While traditional transfer case designs may function in a satisfactory manner in certain vehicle applications, a need for an improved, compact, light weight power transmission device exists.

SUMMARY OF THE INVENTION

A power transmission device for a four-wheel drive vehicle having a power source and first and second drivelines includes an input shaft adapted to be driven by the power source. A first output shaft is rotatable about a first axis and adapted to transmit torque to the first driveline. A second output shaft is adapted to transmit torque to the second driveline and is rotatable about a second axis. The first and second axes do not extend parallel to each other. A transfer unit includes a first cylindrically-shaped gear rotatably supported on the first output shaft and a second conically-shaped gear fixed for rotation with the second output shaft. The first and second gears are in constant meshed engagement with each other.

The present disclosure also provides a power transmission device for use in a four-wheel drive vehicle having a power source and first and second drivelines. The power transmission device includes an input shaft adapted to be driven by the power source. A first output shaft is rotatable about a first axis and is adapted to transmit torque to the first driveline. A second output shaft is adapted to transmit torque to the second driveline and is rotatable about a second axis. The first and second axes diverge from one another. A transfer unit includes a first gear rotatably supported on the first output shaft and a second gear coupled to the second output shaft. The first and second gears are in constant meshed engagement with one another. A universal joint is positioned within a cavity formed in the second gear and drivingly interconnects the second gear and the second output shaft.

BRIEF DESCRIPTION OF THE DRAWINGS

The disclosure will now be described, by way of example, with reference to the accompanying drawings in which.

DETAILED DESCRIPTION OF THE PREFERRED EMBODIMENTS

In general, the present disclosure relates to a power transmission device for a motor vehicle having a first output shaft rotatable about a first axis and a second output shaft that rotates about a second axis of rotation. The first and second axes cross one another. A clutch actuation system may operate a clutch associated with the first and second output shafts of the power transmission device for selectively or automatically shifting between a four-wheel drive mode and a two-wheel drive mode. A gearset including a beveloid gear transfers power between the first output shaft and the second output shaft.

Figure 1:
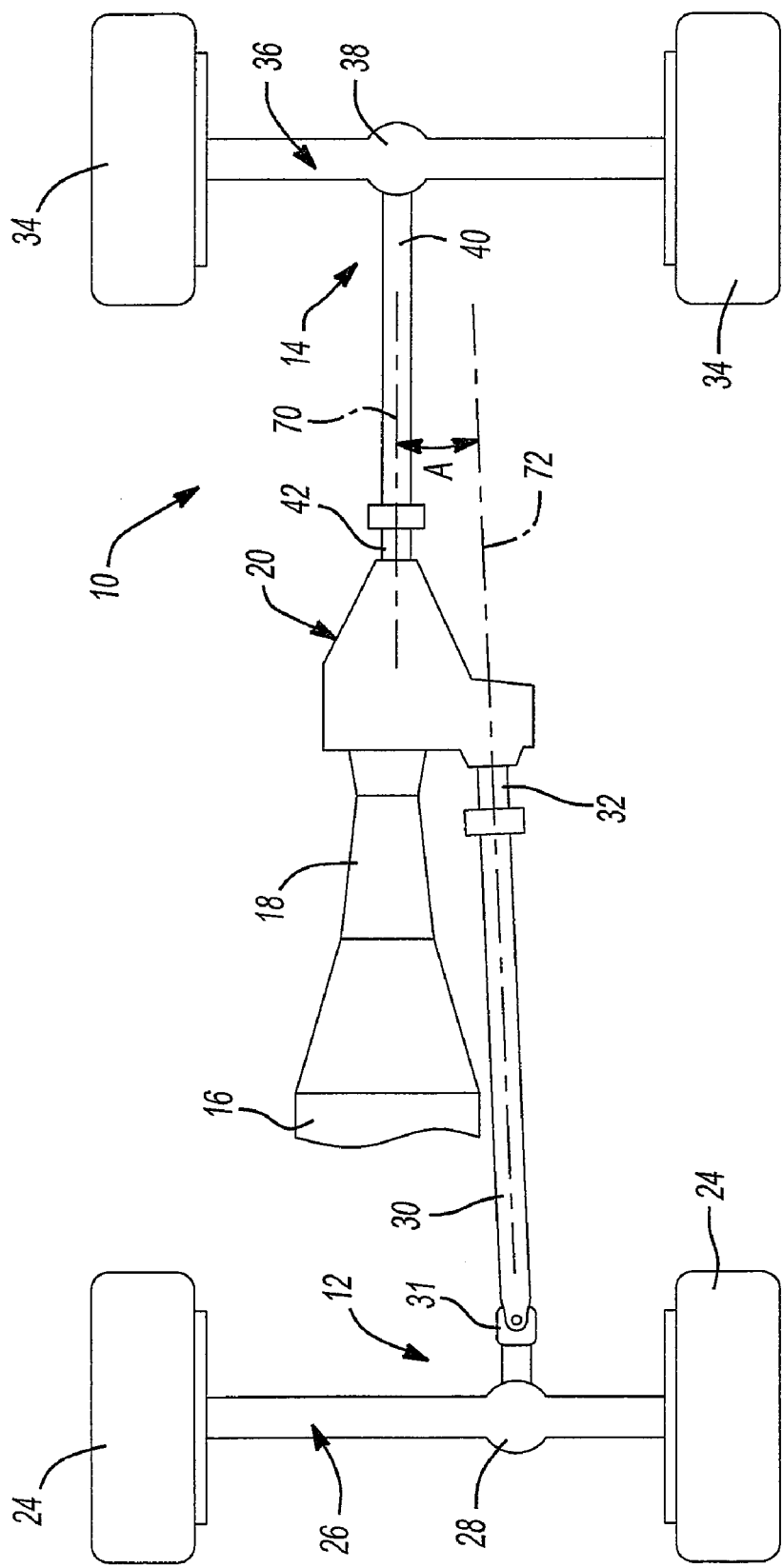
FIG. 1 is a schematic illustrating the drivetrain of a motor vehicle equipped with a power transmission device of the present disclosure.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a power transmission device 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propeller shaft 30 by a universal joint 31. The opposite end of front propeller shaft 30 is coupled to a second or front output shaft 32 of power transmission device 20. Similarly, rear driveline 14 includes a pair of rear wheels 34 connected at opposite ends of a rear axle assembly 36 having a rear differential 38 coupled to one end of a rear propeller shaft 40, the opposite end of which is interconnected to a first or rear output shaft 42 of power transmission device 20.

Figure 2:
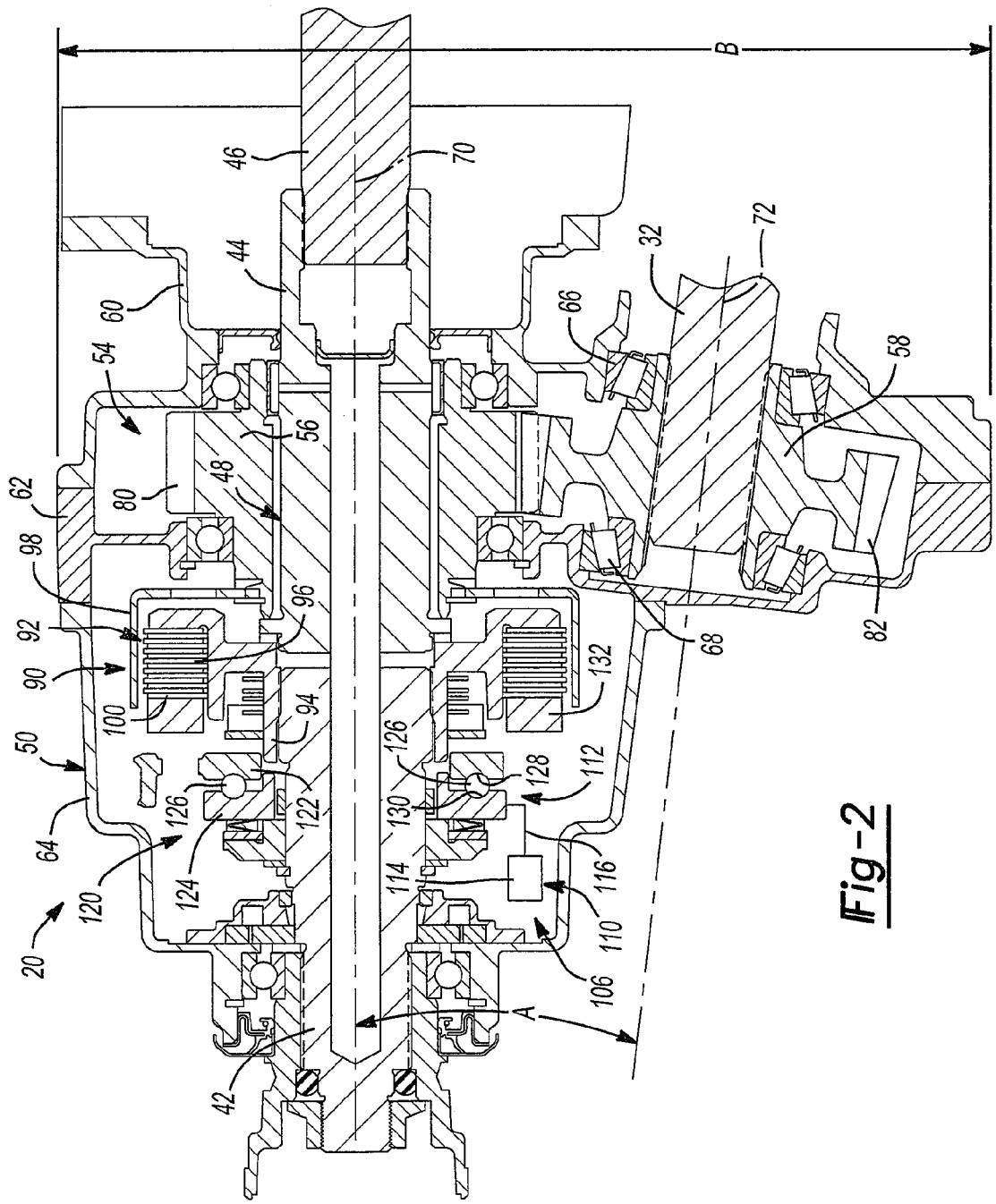
FIG. 2 is a cross-sectional view of the power transmission device according to the present disclosure.

With particular reference to FIG. 2 of the drawings, power transmission device 20 is shown to include an input shaft 44 adapted for connection to an output shaft 46 of transmission 18 such that both are rotatably driven by engine 16 of the motor vehicle. In the arrangement depicted, rear output shaft 42 is integrally formed with input shaft 44 as a one-piece first shaft 48 that is rotatably supported in a housing assembly 50. Front output or second shaft 32 is also rotatably supported in housing assembly 50.

A transfer assembly 54 is provided for selectively transferring drive torque from first shaft 48 to second shaft 32. Transfer assembly 54 includes a first or drive gear 56 rotatably supported on first shaft 48 and a second or driven gear 58 in constant meshed engagement with drive gear 56. Driven gear 58 is fixed for rotation with second shaft 32. Alternatively, driven gear 58 and second shaft 32 may be formed as a single monolithic one-piece member. Housing assembly 50 includes separable first, second and third housings 60, 62 and 64, respectively. Driven gear 58 is rotatably supported within first housing 60 by a first tapered roller bearing 66. Driven gear 58 is also supported for rotation by a second tapered roller bearing 68 positioned within second housing 62.

First shaft 48 is rotatable about a first axis 70. Second shaft 32 is rotatable about a second axis 72. First axis 70 and second axis 72 diverge from one another and define an included angle A. In the Figures, first axis 70 intersects second axis 72. It is also envisioned that second axis 72 may be skew to first axis 70 such that the axes never intersect. Regardless, angle A may be defined by viewing power transmission device 20 as shown in FIG. 2 where a viewing plane of the page includes first axis 70 and a point along second axis 72 that is centered within the gear tooth width. Front propeller shaft 30 is positioned substantially coaxially with second shaft 32 and extends at approximately angle A relative to second propeller shaft 40. By positioning front output shaft 32 at an angle to rear output shaft 42, an overall height B of housing assembly 50 may be minimized. This may be accomplished because front propeller shaft 30 diverges from engine 16 and transmission 18 as front propeller shaft 30 approaches front drive axle 26. A large offset between drive and driven sprockets interconnected by a chain is no longer required. In the example depicted in FIGS. 1 and 2, angle A is substantially seven degrees.

Drive gear 56 is preferably constructed to include teeth 80 defining a circular cylindrical outer shape. Teeth 80 may be straight spur-type gear teeth or alternatively may be helically shaped. To accommodate the cross-axis design previously described, driven gear 58 includes a set of circumferentially spaced apart and conically shaped teeth 82 in constant meshed engagement with teeth 80. As such, a beveloid gearset having cylindrical drive gear 56 engaging conical driven gear 58 is defined.

To provide means for establishing a drive connection between first shaft 48 and second shaft 32, power transmission device 20 includes a mode shift mechanism 90. Mode shift mechanism 90 includes a mode clutch 92 which is operable to couple drive gear 56 to first shaft 48 for establishing a four-wheel drive mode in which second shaft 32 is rigidly coupled for rotation with first shaft 48. In addition, mode clutch 92 is operable for selectively decoupling drive gear 56 from first shaft 48 for establishing a two-wheel drive mode in which all drive torque is delivered to rear output shaft 42.

According to the embodiment shown in FIG. 2, mode clutch 92 is normally operable in a non-actuated mode for transmitting all drive torque to rear output shaft 42, thereby establishing the two-wheel drive mode. Mode clutch 92 is also operable in a fully-actuated mode for establishing a "locked" four-wheel drive mode in which front output shaft 32 is rigidly coupled to rear output shaft 42. In the embodiment shown in FIG. 2, mode clutch 92 is a friction plate clutch. Mode clutch 92 may be controlled to progressively regulate the amount of torque transferred to front output shaft 32 automatically (i.e., on-demand) between its non-actuated and fully-actuated modes in response to and as a function of the amount of relative rotation (i.e., interaxle slip) between front output shaft 32 and rear output shaft 42. The torque versus slip characteristics of mode clutch 92 can be tuned to meet specific vehicular applications.

Mode clutch 92 includes an inner hub 94 fixed to first shaft 48 and to which a set of inner clutch plates 96 are fixed. Mode clutch 92 also includes a drum 98 fixed for rotation with drive gear 56. Drum 98 is cylindrical and has a set of outer clutch plates 100 fixed thereto which are alternately interleaved with inner clutch plates 96 to define a multi-plate clutch pack. Other physical arrangements of mode clutch 92 (not shown) may perform the same function and are contemplated as being within the scope of the present disclosure.

A clutch actuation system 106 controls mode clutch 92. Clutch actuation system 106 includes an actuator 110 and may also include a rotary to linear movement conversion mechanism 112. In particular, actuator 110 includes a drive motor 114 for rotating a drive shaft 116. Drive shaft 116 is coupled to rotary to linear movement conversion mechanism 112. Rotary to linear movement conversion mechanism 112 includes a ball ramp unit 120. Ball ramp unit 120 includes a pair of cam rings 122, 124 and a plurality of balls 126. Each of cam rings 122 and 124 include grooves 128 and 130, respectively. Grooves 128 and 130 have varying depths. Balls 126 are positioned within grooves 128 and 130. When balls 126 are positioned at the deepest portion of grooves 128 and 130, cam rings 122 and 124 are spaced apart a first distance from one another. Cam ring 124 is rotatable relative to cam ring 122 to cause balls 126 to be positioned within the shallow portion of grooves 128 and 130. At this position, cam rings 122 and 124 are spaced apart from one another a distance greater than the first distance. In this manner, ball ramp unit 120 is operable to convert rotary motion to linear motion.

In operation, clutch actuation system 106 is controlled to apply a force on the mode clutch 92. Drive motor 114 rotates drive shaft 116 in a first direction which rotates cam ring 124 relative to cam ring 122 to axially move cam ring 122 and apply a force to an apply plate 132. Inner clutch plates 96 are frictionally engaged with outer clutch plates 100 by apply plate 132 to transfer drive torque from rear output shaft 42 to front output shaft 32. Rotating drive motor 114 in the reverse direction rotates cam ring 124 back to a start position thereby removing the application force from mode clutch 92. Thus, second shaft 32 is no longer driven by first shaft 48. Alternatively, actuator 110 need not be configured to include a drive motor but may utilize other force transmitting mechanisms as appropriate. Furthermore, it should be appreciated that the clutch actuation system previously described may be replaced with a variety of other force application devices including hydraulically or electrically powered pumps acting on one or more pistons, motors driving one or more gearsets and power screws, among others.

Figure 3:
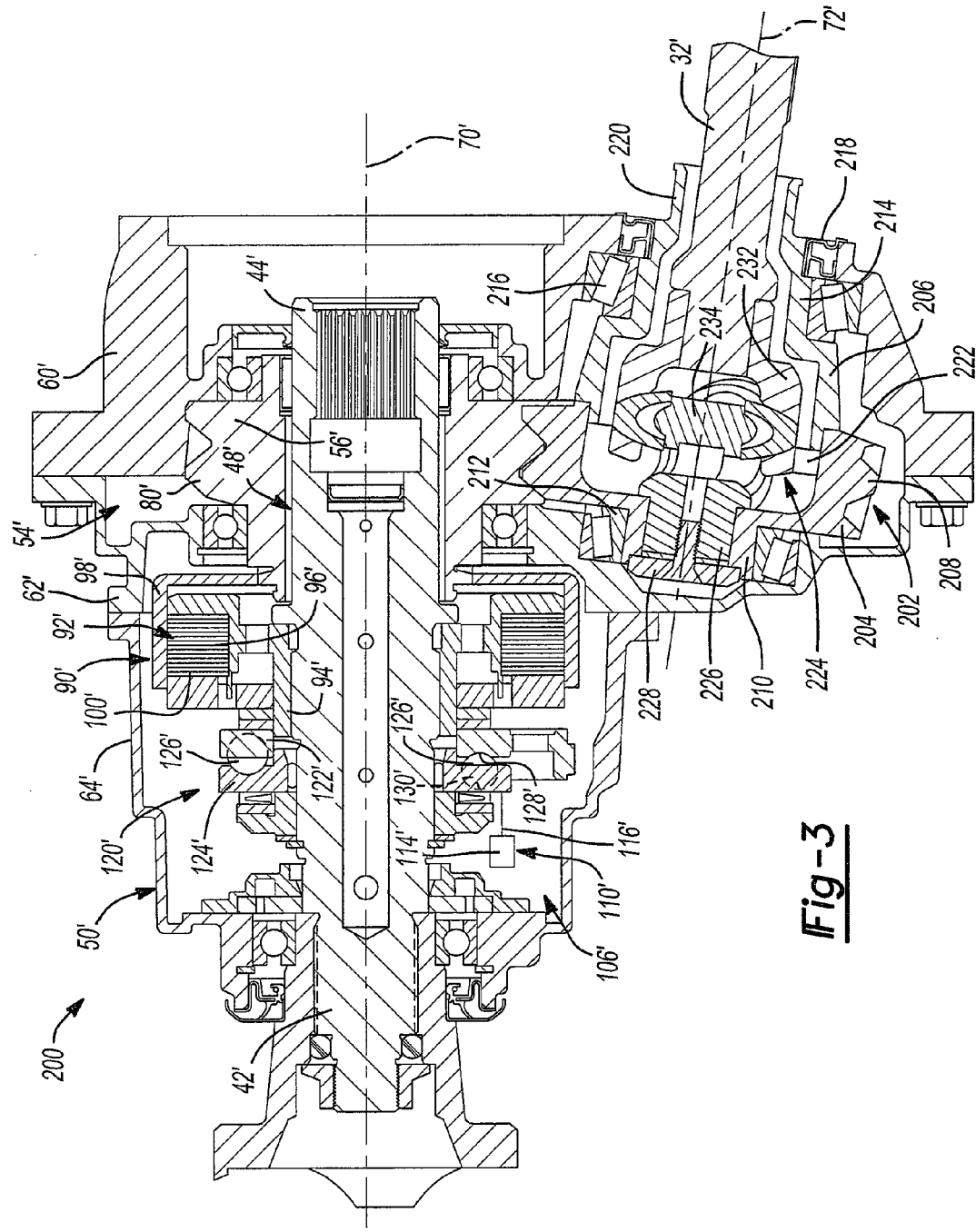
FIG. 3 is a cross-sectional view of an alternative power transmission device associated with the drivetrain shown in FIG. 1.

FIG. 3 depicts another power transmission device identified at reference numeral 200. Power transmission device 200 is substantially similar to power transmission device 20. Accordingly, similar elements will be identified with like reference numerals including a prime suffix. Power transmission device 200 differs from device 20 in that an additional degree of freedom has been provided to front output shaft 32' to allow the front output shaft to articulate about a point positioned within power transmission device 20. The additional degree of freedom may allow a further reduction in the overall height of power transmission device 200 and allow positioning of the device within even further constrained packaging envelopes.

Power transmission device 200 includes a conical driven gear 202 in constant meshed engagement with cylindrical drive gear 56'. Driven gear 202 is a two-part assembly including a first portion 204 fixed to a second portion 206. First portion 204 includes a plurality of conically shaped gear teeth 208 in constant meshed engagement with teeth 80'. First portion 204 also includes a first hub 210 supported for rotation by an angular contact bearing 212. Angular contact bearing 212 may include tapered rollers, balls or a variety of other configurations designed to accurately support driven gear 202 for rotation within second housing 62' as well as react substantial axial loading generated due to the conical shape of teeth 208.

Second portion 206 includes a second hub 214 supported for rotation by another angular contact bearing 216. Angular contact bearing 216 is supported by first housing 60'. A seal assembly 218 restricts contaminants from entering housing assembly 50' while allowing driven gear 202 to rotate relative thereto. Second portion 206 also includes a snout 220 protruding from housing assembly 50' to provide an attachment land for a boot (not shown). The boot sealingly interconnects front output shaft 32' and snout 220 to restrict contamination from entering a cavity 222 defined by first portion 204 and second portion 206.

A single cardan universal joint 224 is positioned within cavity 222. Universal joint 224 includes a first yoke 226 fixed to a stub shaft 228. First yoke 226 and stub shaft 228 are fixed for rotation with driven gear 202. Universal joint 224 also includes a second yoke 232 drivingly coupled to first yoke 226 by a cruciform 234. Cruciform 234 includes two pairs of trunnions. One pair of trunnions is supported for rotation by first yoke 226 and the second pair of trunnions is supported for rotation by second yoke 232. One end of front output shaft 32' is fixed for rotation with second yoke 232. Through this arrangement, torque is transferred from driven gear 202 through first yoke 226, cruciform 234, second yoke 232 to front output shaft 32'. Front output shaft 32' may rotate about an axis other than the axis about which driven gear 202 rotates.

By constructing power transmission devices 20 and 200 as previously described, a family of transfer cases may be defined where a first member of the family includes the components shown in FIG. 1. Another alternate family member may include an alternate first housing and an alternate second housing to rotatably support a driven sprocket or gear rotatable about an axis parallel to axis 70 if the vehicle packaging envelope so allows.

Figure 4:
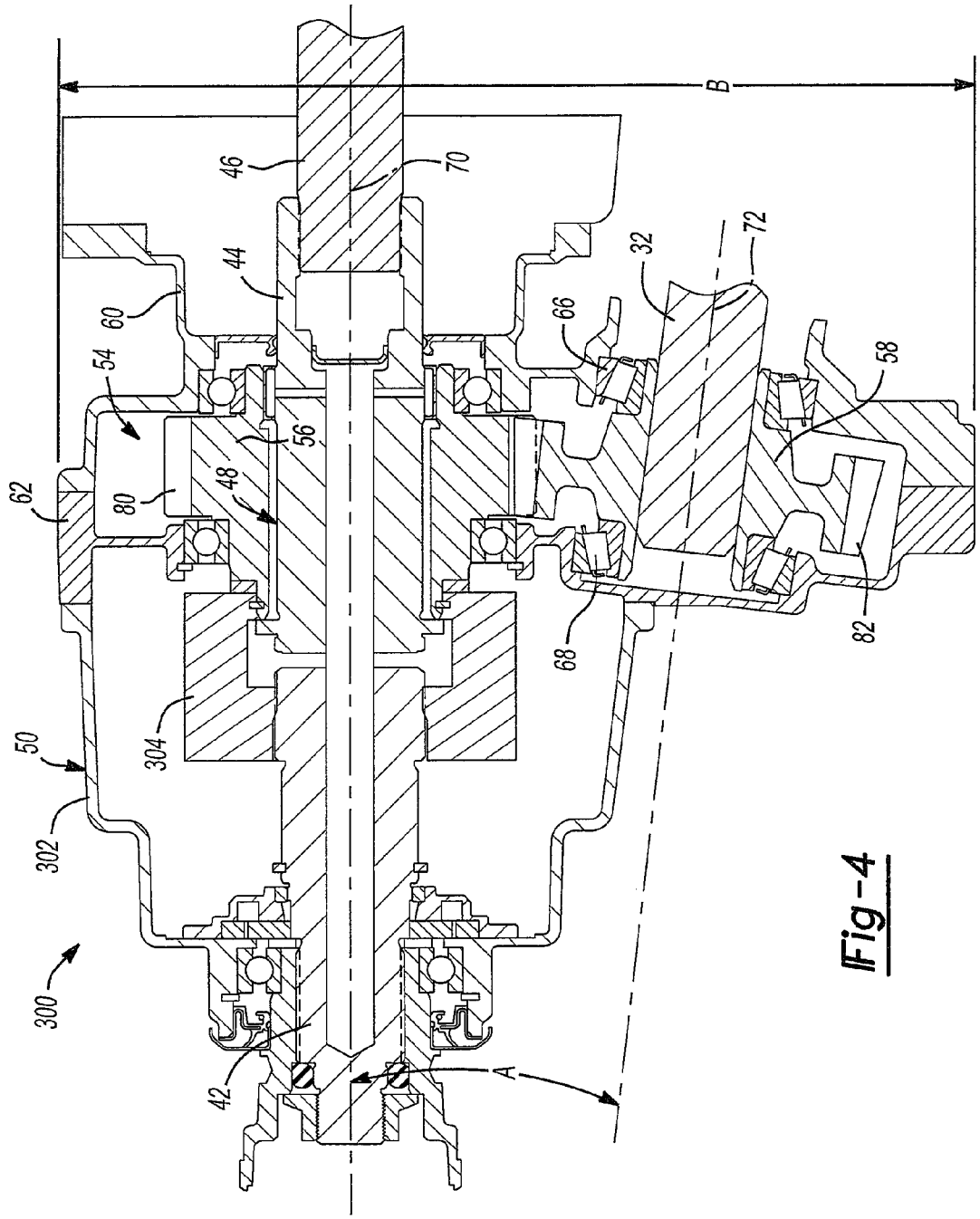
FIG. 4 is a cross-sectional view of another alternative power transmission device associated with the drivetrain shown in FIG. 1.

A further modular approach includes assembling a power transmission device 300, shown in FIG. 4, using first housing 60 and second housing 62 as well as the components positioned therein as shown in FIG. 1. An alternate third housing 302 may replace third housing 64. A module 304 is positioned with third housing 302 and replaces mode clutch 92. Module 304 includes one or more of a center differential, a "part-time" mode clutch, a gearset for providing two or more drive ratios and a pump for providing a clutch actuation force. The part-time clutch may be configured as a stand-alone dog clutch or may comprise a synchronizer cooperating with the dog clutch. Module 304 may also include an actuator for operating the components within third housing 302.

The foregoing discussion discloses and describes various embodiments of the present disclosure. One skilled in the art will readily recognize from such discussion, and from the accompanying drawings and claims, that various changes, modifications and variations can be made therein without departing from the true spirit and fair scope of the disclosure as defined in the following claims.

What is claimed is:

1. A power transmission device for use in a four-wheel drive vehicle having a power source and first and second drivelines, the power transmission device comprising:
   an input shaft adapted to be driven by the power source;
   a first output shaft being rotatable about a first axis and adapted to transmit torque to the first driveline;
   a second output shaft adapted to transmit torque to the second driveline, the second output shaft being rotatable about a second axis, wherein the first and second axes do not extend parallel to each other; and
   a transfer unit having a first cylindrically-shaped gear rotatably coupled to the first output shaft and a second conically-shaped gear fixed for rotation with the second output shaft, the first and second gears being in constant meshed engagement with one another, wherein the first and second axes lie in a common plane and intersect at a point.

2. The power transmission device of claim 1 further including a clutch selectively operable to transfer drive torque between the first output shaft and the first gear, and a clutch actuation system operable to control the clutch.

3. The power transmission device of claim 2 wherein the clutch is a friction plate clutch having a first set of friction elements fixed for rotation with the first output shaft and a second set of friction elements being fixed for rotation with a drum, the drum being fixed for rotation with the first gear.

4. The power transmission device of claim 3 wherein the clutch actuation system includes a rotary to linear movement conversion mechanism.

5. The power transmission device of claim 4 wherein the rotary to linear movement conversion mechanism includes a drive motor and a ball ramp unit including a pair of cam rings spaced apart by a plurality of rolling elements, the drive motor rotating one of the cam rings relative to the other cam ring to apply a force to the friction plate clutch.

6. The power transmission device of claim 3 wherein the torque transferred by the clutch may be varied to transfer different magnitudes of torque to each of the first and second drivelines.

7. The power transmission device of claim 1 wherein the first and second axes of rotation define an included angle of substantially seven degrees.

8. The power transmission device of claim 1 further including a cardan joint positioned within a cavity formed in the second gear.

9. The power transmission device of claim 1 further including a differential assembly operably positioned between the first and second output shafts.

10. A power transmission device for use in a four-wheel drive vehicle having a power source and first and second drivelines, the power transmission device comprising:
    an input shaft adapted to be driven by the power source;
    a first output shaft being rotatable about a first axis and adapted to transmit torque to the first driveline;
    a second output shaft adapted to transmit torque to the second driveline, the second output shaft being rotatable about a second axis, wherein the first and second axes lie in a common plane, intersect at a point and diverge from one another;
    a transfer unit having a first gear rotatably coupled to the first output shaft and a second gear coupled to the second output shaft, the first and second gears being in constant meshed engagement with one another; and
    a universal joint positioned within a cavity formed in the second gear and drivingly interconnecting the second gear and the second output shaft.

11. The power transmission device of claim 10 further including a clutch selectively operable to transfer drive torque between the first output shaft and the first gear, and a clutch actuation system operable to control the clutch.

12. The power transmission device of claim 10 wherein the first gear includes cylindrically-shaped teeth engaging conically-shaped teeth formed on the second gear.

13. The power transmission device of claim 10 wherein the input shaft and the second output shaft are positioned on a first side of the power transmission device, the first output shaft being positioned on an opposite second side.

14. The power transmission device of claim 10 wherein the first and second axes of rotation define an included angle of substantially seven degrees.

15. A power transmission device for use in a four-wheel drive vehicle having a power source and first and second drivelines, the power transmission device comprising:

an input shaft adapted to be driven by the power source;

a first output shaft being rotatable about a first axis and adapted to transmit torque to the first driveline;

a second output shaft adapted to transmit torque to the second driveline, the second output shaft being rotatable about a second axis, wherein the first and second axes do not extend parallel to each other;

a transfer unit having a first cylindrically-shaped gear rotatably coupled to the first output shaft and a second conically-shaped gear fixed for rotation with the second output shaft, the first and second gears being in constant meshed engagement with one another;

a clutch drivingly interconnecting the first output shaft and the first gear, the clutch including a drum fixed for rotation to the first gear, a hub fixed for rotation with the first output shaft, a first set of friction elements driven by the hub and a second set of friction elements fixed for rotation with the first gear; and a clutch actuation system including a first cam ring, a second cam ring and a plurality of balls therebetween wherein rotation of one of the cam rings axially translates the other cam ring to apply a force to the first and second sets of friction elements, wherein the first and second cam rings, the hub, the drum and the first gear each rotate about the first axis.

16. The power transmission device of claim 15, further including an electric motor for transferring torque to a drive shaft, the drive shaft being drivingly coupled to the first cam ring such that rotation of the drive shaft rotates the first cam ring.

17. The power transmission device of claim 16, further including a housing in wherein the first gear is rotatably coupled to the housing with first and second bearings positioned on opposite sides of a plurality of teeth formed on the first gear, the power transmission device also includes another bearing engaging both the first gear and the first output shaft and allowing relative rotation between the first gear and the first output shaft.

\* \* \* \* \*